(12) United States Patent
Chang (10) Patent No.: US 6,738,557 B2
(45) Date of Patent: May 18, 2004

(54) OPTICAL ATTENUATOR HAVING HIGH RETURN LOSS

(75) Inventor: Yao-Hao Chang, Chung-Ho (TW)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 0 days.

(21) Appl. No.: 10/091,771

(22) Filed: Mar. 4, 2002

(65) Prior Publication Data
US 2003/0095779 A1 May 22, 2003

(30) Foreign Application Priority Data
Nov. 21, 2001 (TW) .................... 90220081 U (51) Int. Cl.[7] ................................. G02B 6/00
(52) U.S. Cl. ..................................... 385/140
(58) Field of Search ........................... 385/140

(56) References Cited

U.S. PATENT DOCUMENTS 5,706,379 A * 1/1998 Serafini et al. ............ 385/75
6,185,358 B1 * 2/2001 Park ........................ 385/140
6,196,729 B1 * 3/2001 Stephenson ................ 385/60
2002/0181928 A1 * 12/2002 Chen et al. ............... 385/140

FOREIGN PATENT DOCUMENTS

| JP | 60138502 A | * | 7/1985 | ........... G02B/06/00 |
|----|------------|---|--------|----------------------|
| JP | 62121405 A | * | 6/1987 | ........... G02B/06/00 |
| JP | 62211606 A | * | 9/1987 | ........... G02B/06/32 |
| JP | 01210903 A | * | 8/1989 | ........... G02B/06/00 |
| JP | 03025403 A | * | 2/1991 | ........... G02B/06/00 |
| JP | 04265908 A | * | 9/1992 | ........... G02B/06/00 |
| JP | 06294911 A | * | 10/1994 | ........... G02B/06/00 |

* cited by examiner

Primary Examiner—Hemang Sanghavi
Assistant Examiner—Scott A Knauss
(74) Attorney, Agent, or Firm—Wei Te Chung (57) ABSTRACT

An optical attenuator includes an input optical fiber (11) and an attenuating device (3). The attenuating device is a neutral density (ND) filter. The filter has a refractive index matching that of the input optical fiber, to reduce Fresnel reflectance between the attenuating device and a terminal of the input optical fiber. One surface of the ND filter is not perpendicular to an incident light beam, thus preventing multireflectance between the attenuating device and the terminal of the input optical fiber. Therefore, return loss is increased.

12 Claims, 8 Drawing Sheets

OPTICAL ATTENUATOR HAVING HIGH RETURN LOSS

BACKGROUND OF THE INVENTION

1. Field of the Invention

The present invention relates to optical attenuators used in optical communications systems and optical network technology, and particularly to an optical attenuator having high return loss.

2. Description of Related Art

Optical attenuators are widely used in optical transmission systems and optical networks. Optical attenuators are passive optical components that reduce optical power propagating in optical fibers, and may be categorized as either fixed or variable attenuators.

An important criterion for evaluating optical components such as optical attenuators is return loss. Many fiber transmission systems use laser diodes, and even a small amount of unwanted optical feedback can disturb the lasing characteristics of laser diodes. Such disturbances can include increased intensity of output noise, increased harmonic modulation distortion, and variation of linewidth. An optical attenuator having high return loss allows only minute optical feedback.

A conventional optical attenuator has a neutral density (ND) filter. The ND filter comprises an anti-reflection film stack or a haze film stack, either of which reduces optical feedback. However, such film stacks can only decrease optical feedback rather than completely eliminate it. Furthermore, phase tardiness caused by multireflected light between the attenuating device and the terminal of the input optical fiber still remains.

U.S. Pat. No. 5,109,468 discloses a fixed optical attenuator which is operational within a relatively wide spectral range. Optical fibers of the attenuator have refractive indices similar or equal to refractive indices of optical fibers of the optical transmittance system, therefore the attenuator has low Fresnel reflectance. The attenuator comprises an optical attenuating zone, in which optical signals can be attenuated. The attenuating zone is located in a light path, and comprises a couple of optical fibers which are poorly collimated with a predetermined tolerance. However, the attenuating zone requires exceedingly precise predetermined collimating tolerance. Therefore, in practice, the resulting control of Fresnel reflectance is limited, and the desired attenuation is difficult to obtain.

SUMMARY OF THE PRESENT INVENTION

An object of the present invention is to provide an optical attenuator having high return loss.

Another object of the present invention is to provide an optical attenuator that is easily assembled and collimated.

To achieve the above objects, an optical attenuator in accordance with a preferred embodiment of the present invention comprises an input optical fiber and an attenuating device. The attenuating device is a neutral density (ND) filter. The filter has a refractive index matching that of the input optical fiber, to reduce Fresnel reflectance between the attenuating device and a terminal of the input optical fiber. One surface of the ND filter is not perpendicular to an incident light beam, thus preventing multireflectance between the attenuating device and the terminal of the input optical fiber. Therefore, return loss is increased.

Other objects, advantages and novel features of the invention will become more apparent from the following detailed description when taken in conjunction with the accompanying drawings, in which:

DETAILED DESCRIPTION OF PREFERRED EMBODIMENTS OF THE PRESENT INVENTION

Figure 1:
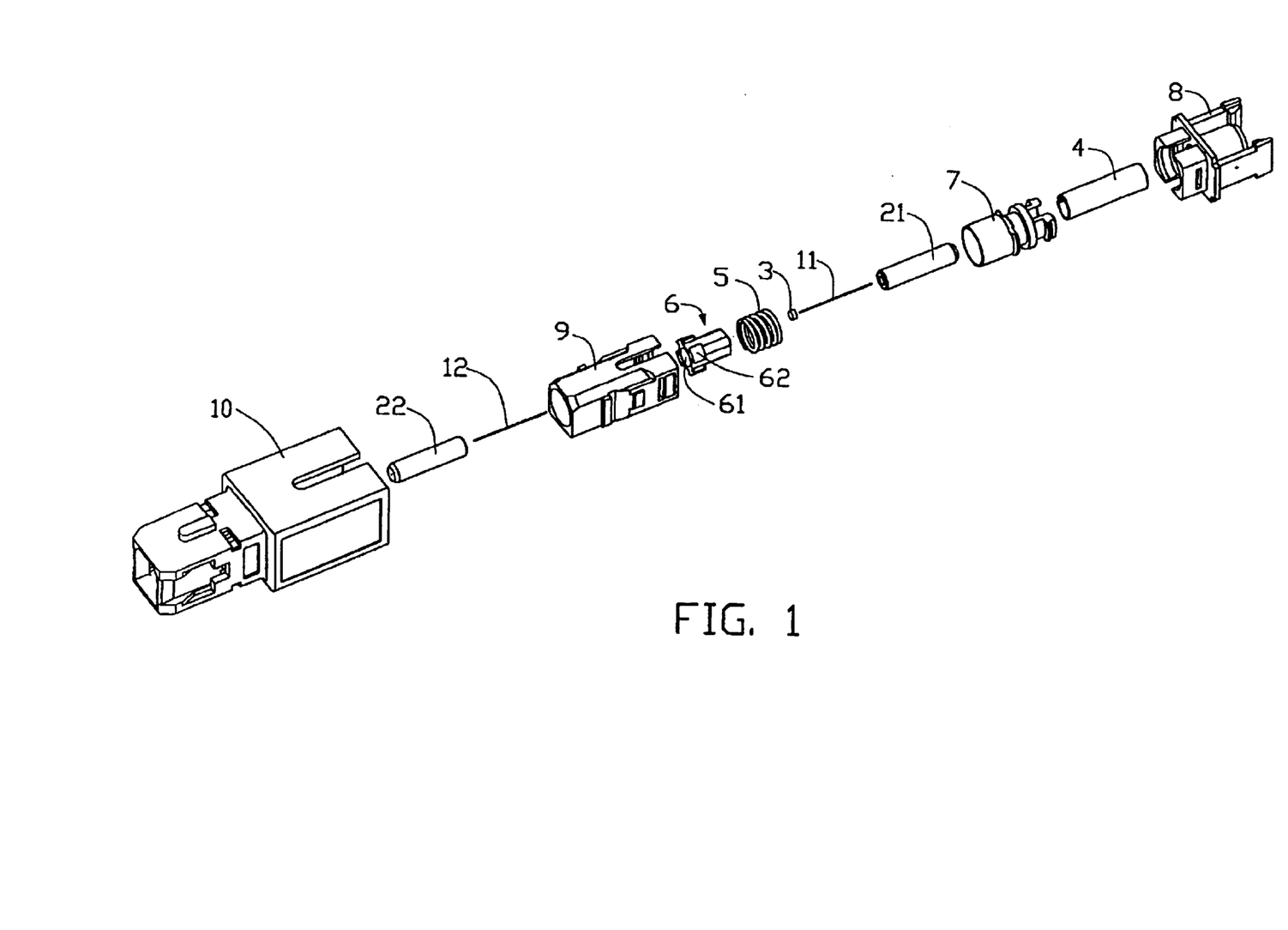
FIG. 1 is an exploded perspective view of an optical attenuator in accordance with a preferred embodiment of the present invention.
Figure 2:
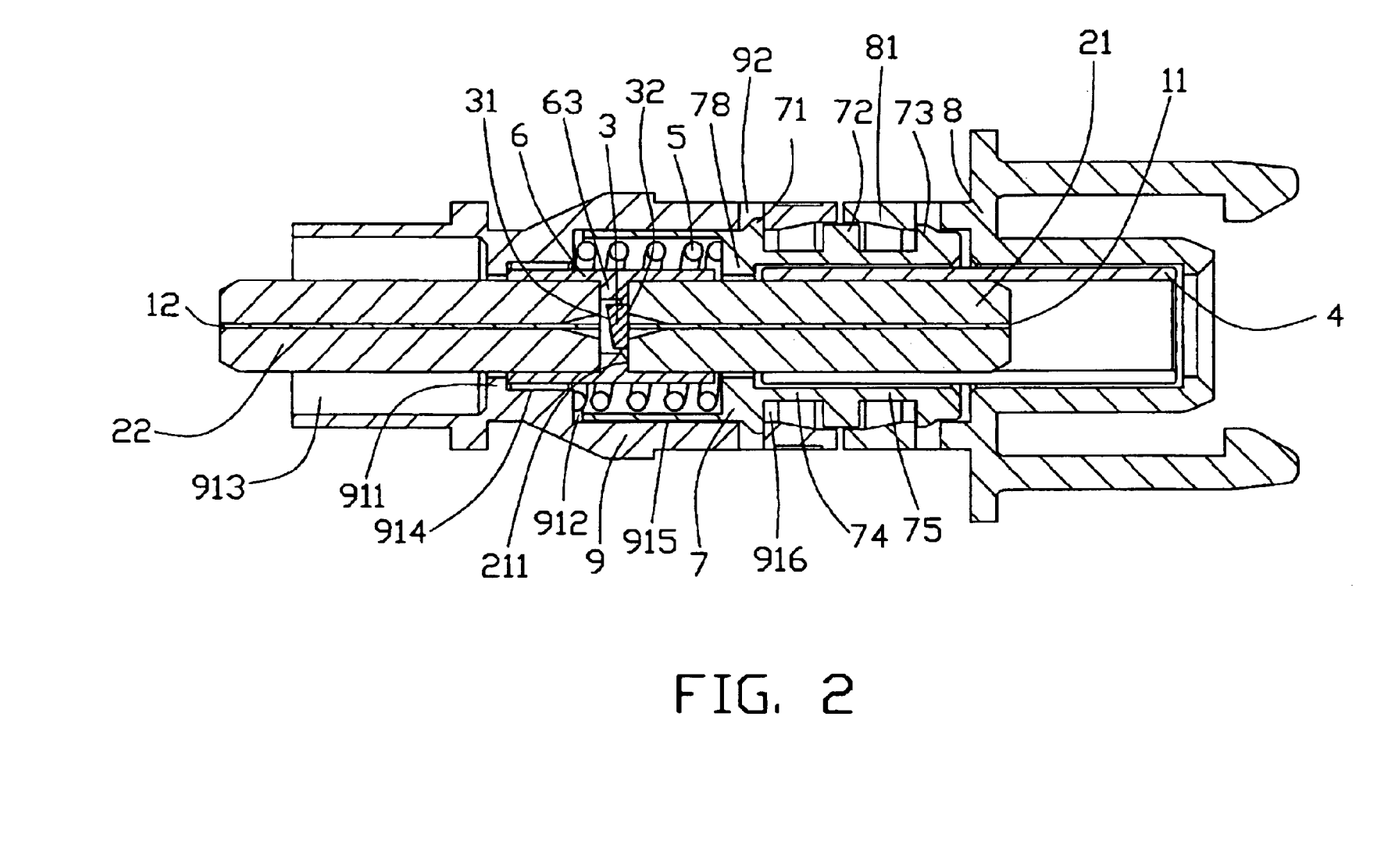
FIG. 2 is a cross-sectional side view of the attenuator of FIG. 1 fully assembled.

Referring to FIGS. 1 and 2, an optical attenuator in accordance with a preferred embodiment of the present invention comprises an input optical fiber 11, an output optical fiber 12, a first ferrule 21, a second ferrule 22, an attenuating device 3, a tube 4, a spring 5, a sleeve 6, a shell 7, a latch 8, a housing 9 and a cover 10.

The attenuating device 3 is a neutral density (ND) filter comprising a first surface 31 and a second surface 32. At least one of the first and second surfaces 31, 32 is not perpendicular to a direction of an incident light beam emitting from the input optical fiber 11. In the preferred embodiment, the first surface 31 is not perpendicular to a direction of an incident light beam emitting from the input optical fiber 11. An angle of non-perpendicularity is in the range of 80° to 100°. In an alternative embodiment of the attenuating device 3, the second surface 32 is not perpendicular to a direction of an incident light beam emitting from the input optical fiber 11. In a further alternative embodiment of the attenuating device 3, both the first and second surfaces 31, 32 are not perpendicular to a direction of an incident light beam emitting from the input optical fiber 11.

The ND filter may be made of optical material such as optical glass, optical crystal, optical ceramic or metal. The optical material has a refractive index matching a refractive index of a core layer of the input and output optical fibers 11, 12, to reduce Fresnel reflectance occurring in the attenuating device 3.

The sleeve 6 comprises a cavity 61 for receiving the first and the second ferrules 21, 22 and the attenuating device 3. The sleeve 6 collimates the input optical fiber 11 with the output optical fiber 12 through the attenuating device 3. An inner ejector 63 is disposed inside the cavity 61, for positioning the first and second ferrules 21, 22 and for accommodating the attenuating device 3 therein. The sleeve 6 further comprises a plurality of outer ejectors 62 for positioning the sleeve 6 in the housing 9.

Figure 3:
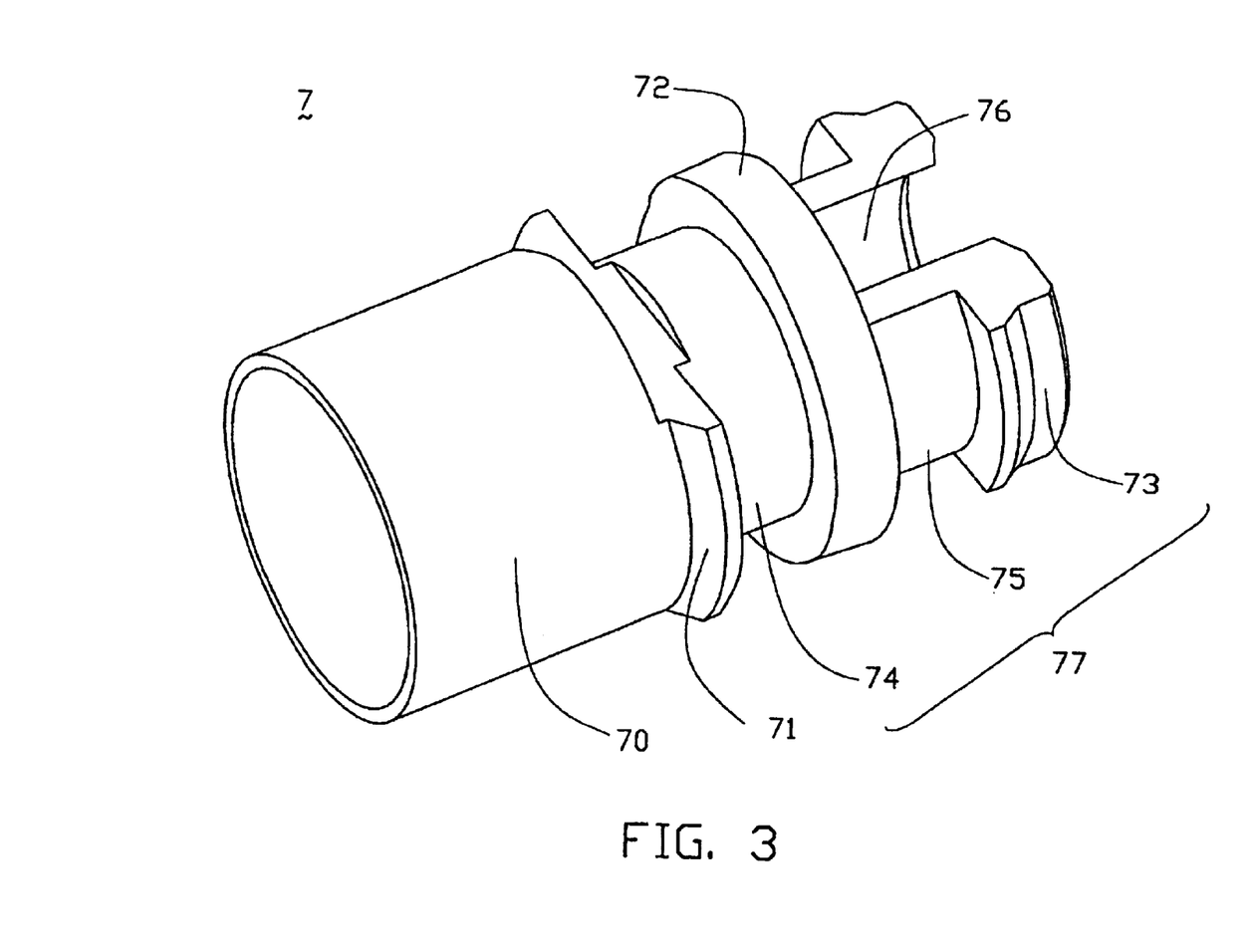
FIG. 3 is an enlarged perspective view of a shell of the attenuator of FIG. 1.

Referring also to FIG. 3, the shell 7 comprises a first receptacle 70 at one end thereof and a second receptacle 77 at an opposite end thereof. The first and second receptacles 70, 77 are connected by a generally outwardly protruding first step 71 and an inner fourth step 78. The second receptacle 77 has an outer second step 72 and an outer third step 73, with the second step 72 being disposed between the first step 71 and the third step 73. A first outer annular slot 74 is defined between the first and second steps 71, 72. A second outer annular slot 75 is defined between the second and third steps 72, 73. Upper and lower parts of the third step 73 and the second receptacle 77 at the second annular slot 75 are cut away, thus forming a generally rectangular opening 76. An internal diameter of the second receptacle 77 is less than an internal diameter of the first receptacle 70. The first receptacle 70 is for receiving the spring 5 and the sleeve 6. The fourth step 78 is for positioning the spring 5 within the first receptacle 70. The second receptacle 77 is for retaining a front part of the tube 4.

Figure 4:
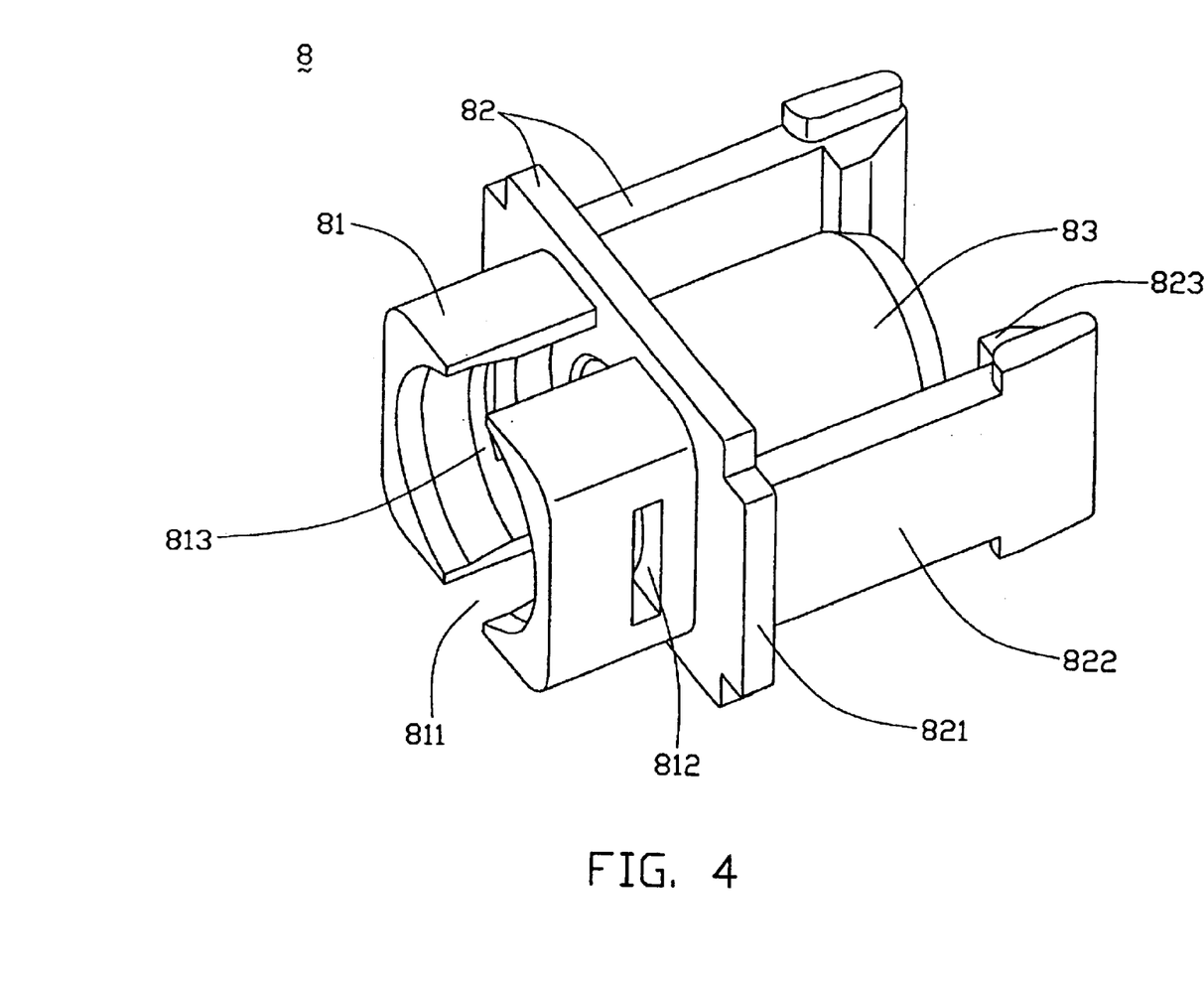
FIG. 4 is an perspective enlarged view of a latch of the attenuator of FIG. 1.

Referring also to FIG. 4, the latch 8 comprises two opposing arch sections 81, a door 82 and a hollow pillar 83. The two arch sections 81 cooperatively define a space 811 therebetween for receiving and retaining the second receptacle 77 of the shell 7. A rectangular slot 812 is defined in an outer sidewall of each arch section 81. The rectangular slots 812 are in communication with the space 811 on opposite sides thereof, and correspond to the third step 73 of the shell 7. An annular rib 813 is formed on an inner sidewall of each arch section 81, corresponding to the second annular slot 75 of the shell 7. The door 82 comprises a transverse plate 821, and a pair of parallel spring wings 822 extending from opposite sides of the plate 821 respectively. A hook 823 is formed at an end of each spring wing 822. The hollow pillar 83 extends from a middle of the plate 821 between the spring wings 822, for receiving a rear part of the first ferrule 21.

Figure 5:
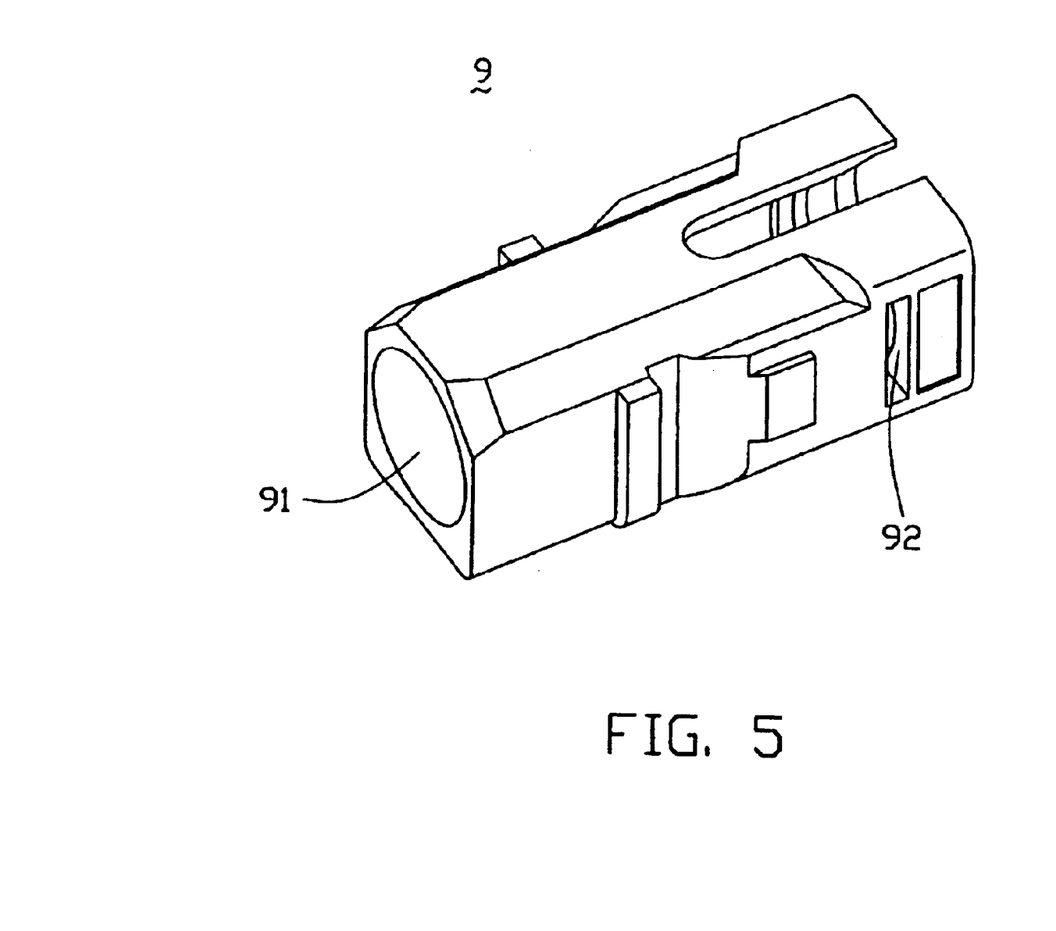
FIG. 5 is an enlarged perspective view of a housing of the attenuator of FIG. 1.

Referring also to FIG. 5, the housing 9 comprises a hollow cavity 91, and two rectangular slots 92 defined in opposite sidewalls of the housing 9 respectively. An inner first step 911 and an inner second step 912 are formed in the housing 9. The hollow cavity 91 thereby comprises a first portion 913 for receiving an optical connector (not shown) and retaining the second ferrule 22, a second portion 914 for receiving the sleeve 6, and a third portion 915 for receiving and retaining the spring 5. The first, second and third portions 913, 914, 915 are sequentially in communication with each other. An inner ejector 916 is disposed in the hollow cavity 91, corresponding to the first annular slot 74 of the shell 7.

Figure 6:
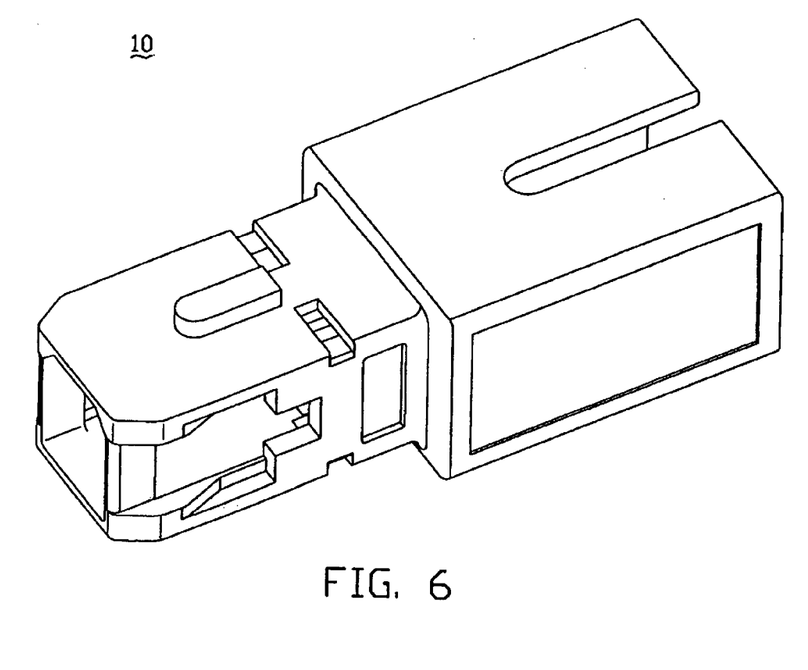
FIG. 6 is an enlarged perspective view of a cover of the attenuator of FIG. 1.
Figure 7:
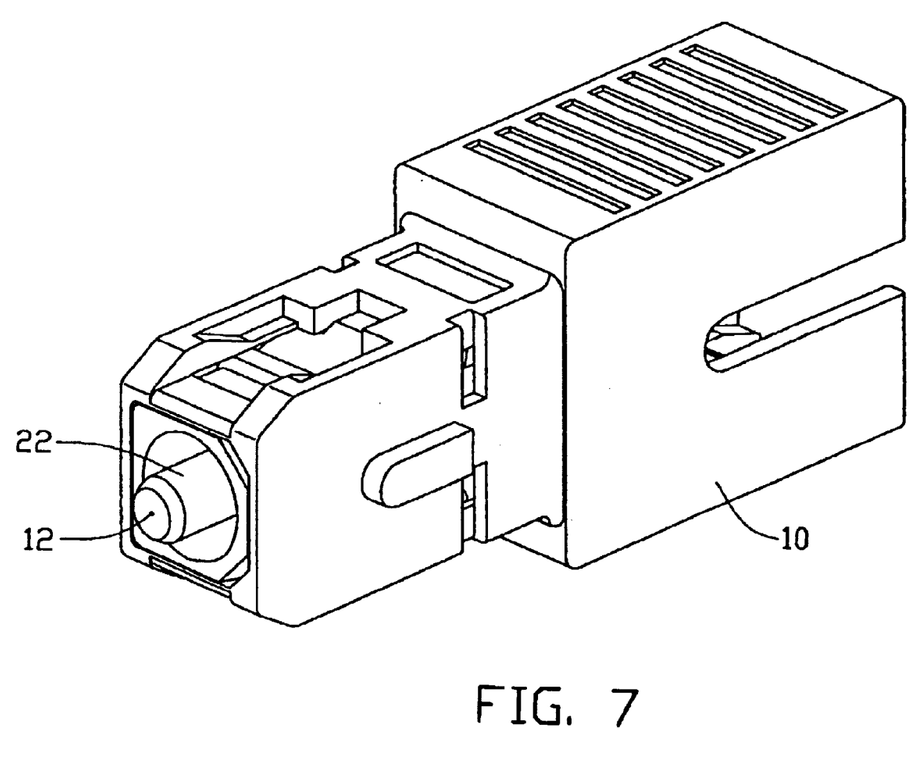
FIG. 7 is a perspective view of the attenuator of FIG. 1 fully assembled.

Referring also to FIGS. 6 and 7, the cover 10 is for receiving the housing 9 therein, and thereby providing a terminal for mating with a standard connector (not shown).

The input optical fiber 11 is for inputting light signals to the attenuating device 3. The output optical fiber 12 is for outputting light signals from the attenuating device 3. The first and second ferrules 21, 22 are made of stabilized or semi-stabilized zirconium oxide ceramic, for protecting and retaining the input and output optical fibers 11, 12 respectively. The first ferrule 21 has a terminal 211.

Referring particularly to FIG. 2, in assembly, the input optical fiber 11 is received in the first ferrule 21 and the output optical fiber 12 is received in the second ferrule 22. The rear part of the first ferrule 21 is precisely retained in the tube 4. The attenuating device 3 is attached to the terminal 211 of the first ferrule 21, thereby covering a terminal (not labeled) of the input optical fiber 11. The front part of the tube 4 is received in the second receptacle 77 of the shell 7. The spring 5 is placed over the sleeve 6. The combined sleeve 6 and spring 5 is retainingly attached around the front part of the first ferrule 21. The second ferrule 22 is inserted into an opening (not labeled) of the housing 9. The combined sleeve 6, spring 5, shell 7, tube 4 and first ferrule 21 is inserted into an opposite opening (not labeled) of the housing 9. The input optical fiber 11 can thus collimate to the output optical fiber 12 through the attenuating device 3. The latch 8 is attached to the housing 9, and secures a rear part of the tube 4 therein. Finally, the cover 10 is retainingly attached over all the aforesaid components. A front end of the second ferrule 22 is exposed outside the cover 10, for connecting with the optical connector (not shown).

In operation, an incident light beam received from the input optical fiber 11 enters the attenuating device 3 and is attenuated therein. After attenuation, the light beam is transmitted to the output optical fiber 12 and output accordingly. Part of the transmitted light may be reflected back to the attenuating device 3. Such reflected light is reflected by the first surface 31 of the attenuating device 3. The first surface 31 is not perpendicular to the direction of the incident light beam. Therefore, the reflected light is prevented from feeding back to the input optical fiber 11. This increases return loss of the optical attenuator.

Figure 8:
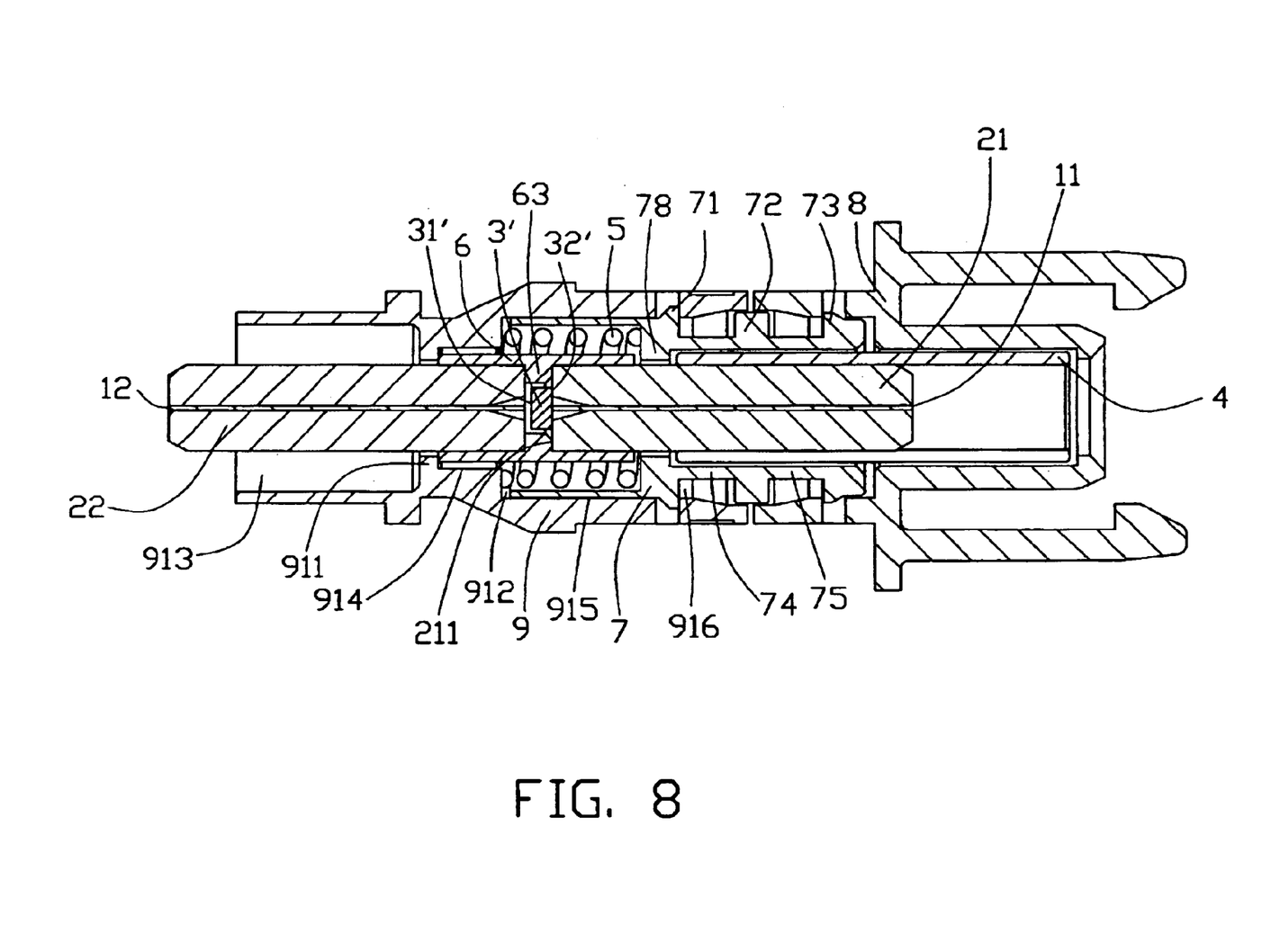
FIG. 8 is a cross-sectional side view of a fully assembled optical attenuator in accordance with an alternative embodiment of the present invention.

FIG. 8 shows an optical attenuator in accordance with an alternative embodiment of the present invention. First and second surfaces 31', 32' of an attenuating device 3' are both perpendicular to a direction of an incident light beam. The optical attenuator is easy to assemble and reduces costs.

Other modifications and adaptations of the above-described embodiments of the present invention may be made to meet particular requirements. This disclosure is intended to exemplify the invention without limiting its scope. All modifications that incorporate the invention disclosed in the embodiments are to be construed as coming within the scope of the appended claims or the range of equivalents to which the claims are entitled.

I claim:

1. An optical attenuator comprising:
   an input optical fiber, for inputting light signals to be attenuated;
   an output optical fiber, for outputting attenuated light signals;
   a first ferrule receiving the input optical fiber therein;
   a second ferrule receiving the output optical fiber therein;
   a neutral density filter comprising a first surface and a second surface, wherein at least one of the first surface and the second surface is not parallel to end surfaces of said input optical fiber and said output optical fiber;
   a plurality of retaining devices retaining the filter, the first ferrule and the second ferrule; and
   a cover retaining the retaining devices and protecting the optical attenuator; wherein
   the neutral density filter is attached to a terminal of the first ferrule, and is spaced from a terminal of the second ferrule which confronts the terminal of the first ferrule, and the neutral density filter has a refractive index matching refractive indices of the input optical fiber and the output optical fiber.

2. The optical attenuator as described in claim 1, wherein the optical attenuator is a fixed optical attenuator.

3. The optical attenuator as described in claim 1, wherein the plurality of retaining devices comprises:
   a tube having a space retaining the first ferrule, and a space for receiving a ferrule of an input optical connector;
   a shell receiving a front part of the tube therein;

a sleeve having a space protecting the first ferrule and the input optical fiber therein;

a spring located between the sleeve and the shell and being received in the shell;

a latch protecting the input optical fiber and an optical fiber of the input optical connector therein; and a housing having a space receiving and protecting the tube, the shell, the sleeve, and the spring.

4. An optical attenuator comprising:

an input optical fiber;

an output optical fiber;

a first ferrule receiving the input optical fiber therein;

a second ferrule receiving the output optical fiber therein;

an attenuating device disposed in a light path between the input optical fiber and the output optical fiber;

a tube having a space retaining the first ferrule, and a space for receiving a ferrule of an input optical connector;

a shell receiving a front part of the tube therein;

a sleeve having a space protecting the first ferrule and the input optical fiber therein;

a spring located between the sleeve and the shell and being received in the shell;

a latch partially receiving the input optical fiber and an optical fiber of the input optical connector therein;

a housing having a space receiving and protecting the second ferrule, the attenuating device, the rube, the shell, the sleeve, and the spring; and a cover retaining and protecting the housing, the second ferrule, the attenuating device, the shell, the sleeve, the spring and the latch.

5. The optical attenuator as described in claim 4, wherein the attenuating device is a neutral density filter comprising a first surface and a second surface.

6. The optical attenuator as described in claim 5, wherein at least one of the first surface and the second surface is not perpendicular to a direction of an incident light beam.

7. The optical attenuator as described in claim 5, wherein both the first surface and second surface are substantially perpendicular to an incident light beam.

8. An optical attenuator comprising:

opposite input and output optical fibers respectively enclosed in first and second ferrules with confrontation ends of said first and second ferrules spaced from each other;

a neutral density filter positioned between said confrontation ends; and a retainer holding said first ferrule and said second ferrule to have said first fiber, said second fiber and said neutral density filter moved together axially; wherein said neutral density filter comprises a first surface and a second surface, and at least one of said first surface and said second surface is not perpendicular to a direction of an incident light beam; and said retainer comprises a spring, a sleeve, a tube, and a shell, and said spring and said sleeve are received in a first receptacle of said shell, and said tube is partially received in a second receptacle of said shell.

9. The attenuator as described in claim 8, wherein at least one of the first surface and the second surface is not parallel to end surfaces of said input optical fiber and said output optical fiber.

10. The attenuator as described in claim 8, wherein said neutral density filter is attached to a terminal of said first ferrule, and is spaced from a terminal of said second ferrule which confronts said terminal of said first ferrule.

11. The attenuator as described in claim 8, wherein said sleeve comprises a cavity for receiving said first and said second ferrules, a plurality of outer ejectors on an outside surface thereof, and an inner ejector formed inside said cavity for accommodating said neutral density filter therein.

12. The attenuator as described in claim 8, wherein said retainer includes a sleeve recoverably urged by a spring, and said sleeve defines a cavity divided by an inner ejector to form two separate spaces respectively receiving the corresponding first and second ferrules, and wherein a narrowed space between said two spaces surrounded by said inner ejector accommodates the neutral density filter.

* * * * *